UNITED STATES PATENT OFFICE.

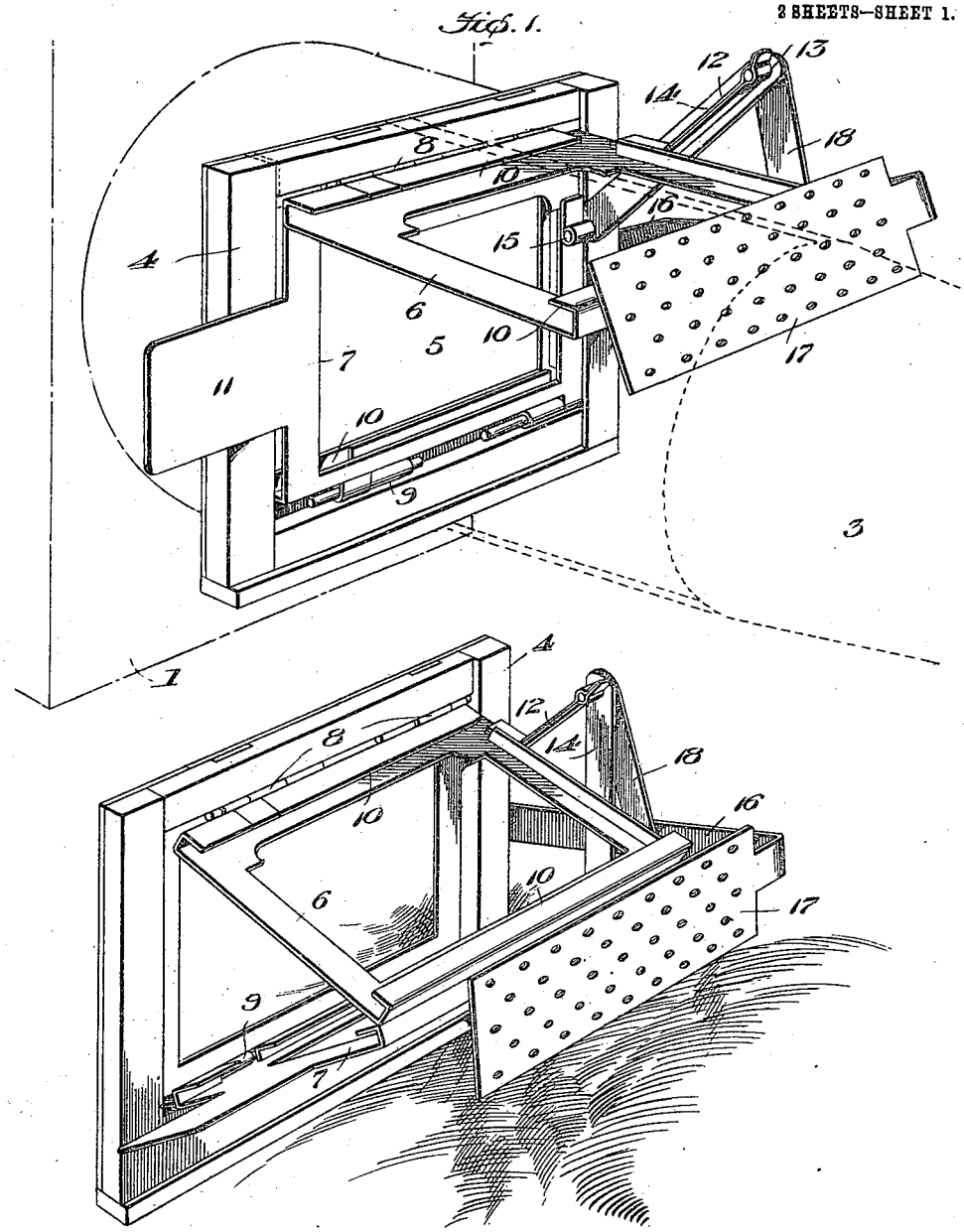

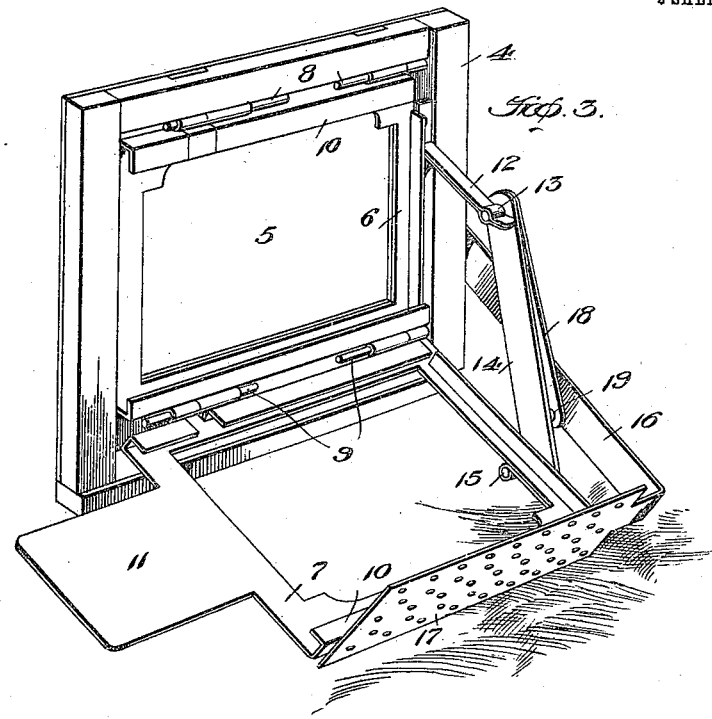
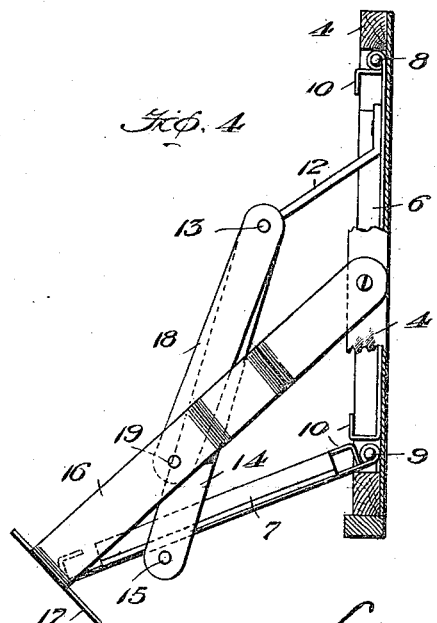

LESTER L. WELSH, OF EMPORIUM, PENNSYLVANIA.

SLIDE-CARRIER FOR MAGIC LANTERNS.

964,350. Specification of Letters Patent. Patented July 12, 1910.

Application filed August 9, 1909. Serial No. 512,043.

*To all whom it may concern:*

Be it known that I, LESTER L. WELSH, a citizen of the United States, residing at Emporium, county of Cameron, and State of Pennsylvania, have invented certain new and useful Improvements in Slide-Carriers for Magic Lanterns, of which the following is a specification.

My invention relates to slide carriers for magic lanterns.

The object of the present invention is the provision of a carrier for magic lantern slides which can be applied to any picture projecting machine having a single lamp and utilized to produce a dissolving effect when one picture is merged into another without resulting in a dark curtain at any time and operable from one side of the machine without the necessity of reaching over the lamp house.

In carrying out the foregoing object, I provide a frame adapted to be applied to the machine, a pair of slide carriers carried by the frame, and a novel mechanism whereby the carriers are simultaneously operated in such manner that when a slide is in use, a new slide may be inserted in the other carrier and the carriers may be readily manipulated from one side and a dissolving effect obtained when one slide succeeds the other.

In the accompanying drawings:—Figure 1 is a perspective view illustrating the lowermost carrier in displaying position, dotted lines representing the picture projecting machine; Fig. 2, a perspective view showing the frames and dissolver when the parts are in dissolving position; Fig. 3, a perspective view showing the uppermost slide carrier in displaying position; and Fig. 4, an end elevation, partly in section, of the parts when in the position shown in Fig. 3.

The present invention is designed to obviate the necessity of employing two lamps and two sets of lenses in a picture projecting machine, such machine being shown at 1, on which any suitable retaining means may be provided to hold the slide carrier while the focusing device 3 of any desired form may be used beyond the space left for the operation of the slide carrier.

The slide carrier frame 4, which is adapted to be slid into the lips 2, has an opening 5 which defines the outline of the picture therein on the curtain or screen. There are two slide carriers 6 and 7, respectively hinged to opposite sides of the frame 4 at 8 and 9, the said slide carriers being provided with lips 10 for receiving the slide which is positioned therein by sliding it in from one end of the slide carrier. One of the slide carriers is provided with a finger-piece 11, whereby the slide carriers are manipulated.

Secured to the slide carrier 6 is an arm 12, to which is pivoted at 13 a link 14, which in turn is pivoted to the slide carrier 7 at 15. The proportions of the arm and link are such that when the slide carrier 6 is in position to display the slide carried thereby, the slide carrier 7 is lowered out of the path of the rays of light so that the slide can be readily slipped into the carrier 7 without interfering with the display of the picture, and when the slide carrier 7 is in position to display the slide carried thereby, the arm and link 14 are so positioned that the slide carrier 7 is retained in position and the slide carrier 6 is located so that it will not interfere with the rays of light and will admit of the removal of the previously displayed slide therefrom and the admission of a new slide, and hence when the slide in the carrier 7 has been displayed, the finger-piece 11 may be manipulated to position the slide carrier 6 with the new slide therein. The manipulation of the slide carriers being effected at the side and the slides being inserted at the side, it is not necessary for the operator to reach over the light house, nor to interfere in any way with the display of the slides.

Pivoted to the frame 4 is an arm 16 which carries a perforated plate or shutter 17 whose purpose is to break up the image and cause a dissolving effect as one slide carrier takes the place of the other, as well as to prevent the appearance on the screen of any bright light, this dissolver or shutter being brought in line as the free edges of the slide carriers 6 and 7 come together, as shown in Fig. 2. In order to accomplish this result, the link 18, which is pivoted at 19 to the arm 16, is likewise connected to the pivotal connection 13 between the arm 12 and the link 14.

The operation of the slide carriers being as heretofore set forth, the dissolver or shutter 17 is adapted to follow the slide carrier which is being removed from displaying position so that it will not interfere with the display of the slide.

Having thus described my invention, what

I claim as new and desire to secure by Letters Patent, is:—

1. In a slide carrier mechanism, the combination of hinged slide carriers, and operating mechanism whereby said slide carriers are adapted to pass by each other when one is taking the displaying position previously assumed by the other.

2. In a slide carrier mechanism, the combination of hinged slide carriers, and operating mechanism whereby said slide carriers are adapted to pass by each other when one is taking the displaying position previously assumed by the other, a dissolver, and means for operating said dissolver adapted to position it in line with the forward edges of the slide carriers when they come together prior to passing each other.

3. In a slide carrier mechanism, the combination of hinged slide carriers, and operating mechanism articulating or connecting said slide carriers together, whereby said slide carriers are simultaneously operated and one is adapted to pass the other as it takes the position previously assumed by the other slide carrier.

4. In a slide carrier mechanism, the combination of hinged slide carriers, and operating mechanism articulating or connecting said slide carriers together, whereby said slide carriers are simultaneously operated and one is adapted to pass the other as it takes the position previously assumed by the other slide carrier, a dissolver, and means operated by the slide carriers adapted for positioning the dissolver in line with the forward edges of the slide carriers when they come together prior to passing each other.

5. In a slide carrier mechanism, the combination of hinged slide carriers positioned so that they will be adapted to pass each other when one assumes the displaying position previously assumed by the other, and levers constituting an operative connection between said slide carriers whereby they are simultaneously operated.

6. In a slide carrier mechanism, the combination of hinged slide carriers positioned so that they will be adapted to pass each other when one assumes the displaying position previously assumed by the other, levers constituting an operative connection between said slide carriers whereby they are simultaneously operated, and a dissolver connected to and operated by said levers.

In testimony whereof, I hereunto affix my signature in presence of two witnesses.

LESTER L. WELSH.

Witnesses:
W. G. BAIR,
GEO. P. JONES.